United States Patent [19]

Yamane

[11] Patent Number: 4,686,195

[45] Date of Patent: Aug. 11, 1987

[54] METHOD AND COMPOSITION FOR THE MANUFACTURE OF GRADIENT INDEX GLASS

[75] Inventor: Masayuki Yamane, Kawasaki, Japan

[73] Assignee: University of Rochester, Rochester, N.Y.

[21] Appl. No.: 820,486

[22] Filed: Jan. 16, 1986

[51] Int. Cl.[4] .......................... C03C 3/00; C03C 13/04
[52] U.S. Cl. ........................................ 501/12; 501/37
[58] Field of Search .................. 501/12, 37; 65/18.1, 65/18.4, 3.1

[56] References Cited

U.S. PATENT DOCUMENTS

| | | | |
|---|---|---|---|
| 4,061,486 | 12/1977 | Jahn | 65/18.4 |
| 4,177,319 | 12/1979 | Jahn | 428/410 |
| 4,275,951 | 6/1981 | Beales et al. | 501/37 |
| 4,299,608 | 11/1981 | Macedo et al. | 65/3.1 |
| 4,323,381 | 4/1982 | Matsuyama et al. | 501/12 |
| 4,436,542 | 3/1984 | Kurosaki | 65/18.1 |
| 4,452,508 | 6/1984 | Beales et al. | 501/37 |
| 4,495,297 | 1/1985 | Puyane et al. | 501/12 |

FOREIGN PATENT DOCUMENTS 60-166420  8/1985  Japan ...................... 501/12

OTHER PUBLICATIONS

Mukherjee, S. Gradient Index Lens Fabrication Processes: a Review, in Topical Meeting on Gradient-Index Optical Imaging Systems . . . , Optical Soc. Am. (May 1981), pp. 1-5.
Mukherjee, S. Sol-Gel Processes in Glass Science and Technology, J. Non-Cryst. Solids, 42 (1980), pp. 477-482.
Brinker, C. J., et al., Conversion of Monolithic Gels to Glasses in a Multicomponent Silicate Glass System . . . , J. Mat. Science, 16 (1981), pp. 1980-1988.
McCarthy, G. J. et al., "Gel Route to Homogeneous Glass Preparation: II, Gelling and Desiccation", J. Am. Cer. Soc. 54 (1971), pp. 639-640.
Johnson, D. W. "Sol-Gel Processing of Ceramics and Glass" Am. Cer. Soc. Bull. 64 (12) (1985), pp. 1597-1602.

*Primary Examiner*—William R. Dixon, Jr.
*Assistant Examiner*—Karl Group
*Attorney, Agent, or Firm*—Robert M. Hallenbeck; Martin LuKacher

[57] ABSTRACT

An inexpensive method and composition for the manufacture of large sized, high gradient index glass using a sol-gel diffusion process in which the ions that form the metal oxides are of unequal valence.

14 Claims, No Drawings

METHOD AND COMPOSITION FOR THE MANUFACTURE OF GRADIENT INDEX GLASS

DESCRIPTION

This invention relates to the manufacture of gradient index glass and a composition therefor. More particularly, it relates to a novel sol-gel diffusion process whereby large diameter, high gradient index glass can be manufactured relatively inexpensively, and relates to a composition useful therefor in which the ions that form the metal oxides are of unequal valence.

Gradient index glass is a structure wherein the index of refraction changes across the structure. Typically, such structures are cylinder-shaped and the index changes in a radial fashion with the highest index being centrally located and decreasing as the perimeter is approached.

Such structures recently have been in great demand for use as lenses in fiberoptics and in photocopy equipment. Several methods are known for the making of such structures. These methods include ion-exchange in glass, "molecular stuffing" of porous glass and a phase separation and partial leaching of glass. These methods have been reviewed by Mukherjee in *Gradient Index Lens Fabrication Processes: A Review*, in Topical Meeting on Gradient-Index Optical Imaging Systems, Optical Society of America (1981).

Each of those methods has several drawbacks. The ion exchange process is slow because of low diffusion rates and has not been practical to make lenses of greater than 10 mm aperture. The molecular stuffing process can make larger lenses with low index gradients; moreover, the gradients are not always uniform. The phase separation/leaching method may produce lenses of 10 mm aperture but they will have low index gradients which are not always uniform.

In his 1981 review, Mukherjee also described a method of diffusion of inorganic oxides in a gel monolith. He proposed a sol-gel system whereby a gel monolith is preformed with modifying ion specie which subsequently diffuse out and are replaced with another modifying ion specie of equal valence. The resulting structure would have a large size, with a high index gradient which is uniform. Mukherjee previously applied this method to the making of non-gradient index glass. See Mukherjee, *Sol-Gel Processes in Glass Science and Technology*, J. Non-Cryst. Solids, 42:477 (1980); and Brinker and Mukherjee, *Conversion of Monolithic Gels to Glasses in a Multicomponent Silicate Glass System*, J. Mat. Sci., 16:1980 (1981).

Kurosaki (see U.S. Pat. No. 4,436,542) nas attempted to practice a method for the manufacture of gradient index glass. Kurosaki employs silicic acid in a thallium, rubidium or cesium nitrate solution which is neutralized with acid. This forms a colloidal matrix which may be poured into a mold to produce a gel. The gel then is immersed in a leachate solution of water, acid, alkali metal salt, ketone or alcohol. This results in a gradient of Rb, Cs or Tl which decreases radially outwardly while the leachate ion gradient decreases radially inwardly. The gel then is dryed and sintered to form transparent glass. The structures produced are disclosed to have a diameter of 13 mm. No index gradient change (i.e., the difference between the index at the center less the index at the perimeter, hereinafter "$\Delta_n$") is given. Further, the ions in the leachate described in all of the examples are $H^+$, $NH_4^+$ or a combination thereof. None of these leachates participate in the formation of the gradient index nor do they modify any other property of the glass (e.g., thermal expansion coefficient, glass transition, temperature, viscosity). Thus, the process essentially is a leaching process and not one of ion inter-diffusion.

Apart from the above-described limitations, all of the methods use mono-valent ions to the extent any ion interchange is contemplated. This has the effect of putting an upper limit on $\Delta_n$ since the modifying effect of mono-valent ions is limited. An interchange of ions of unequal valence or an interchange of multi-valent ions has not been tried in the above described methods because of the requirement of electrical neutrality within solid glass.

The method and composition disclosed herein have achieved the unexpected result of avoiding the electrical neutrality requirement and of allowing ions of unequal valence to be used in a sol-gel diffusion process to make gradient index glass. Briefly described, a source of alkoxysilane is intensively mixed with an aqueous solution with a source of boron and containing an acid catalyst and forms a sol. The sol warms by its own heat of reaction and then is cooled to room temperature. Once cooled, an aqueous metal salt solution is added as a source of modifier cations to increase the refractive index of the eventual glass. The entire mixture then is added to a tightly sealed mold.

The sol becomes a wet gel upon setting. It is removed from the mold and immersed in an aqueous salt bath as a source of interchangable modifier cations. The gel is left in the bath for a period to time during which the metal ions will differentially migrate out and in to form gradients which run in opposite directions. The gel then is removed from the bath, heated, dessicated and then densified by heat treatment up to a temperature around the glass transistion point of melt-formed glass of similar composition. The result is a gradient index glass with a large $\Delta_n$ and large diameter that can be made from relatively inexpensive materials in a relatively short period of time.

An object of this invention is to avoid the requirement of electrical neutrality in the manufacture of gradient index glass.

An advantage of the invention is that ions of unequal valence can be used in a sol-gel diffusion process without adversely affecting the quality of the structure while removing the upper limit of $\Delta_n$.

A feature of this invention is that compositions of gradient index glass can be formed of combinations of metal oxides heretofore not possible by a sol-gel diffusion process.

Other objects, features and advantages of the invention will become more apparent from the following detailed description of the invention and examples thereof.

Tetraethoxysilane ("TEOS") and/or tetramethoxysilane ("TMOS") is preferred as the source of alkoxysilane, and therefor, silica. The silica will form $SiO_2$ in the eventual glass and intermediately the sketetal part of the gel.

The molar percentage of $SiO_2$ in the eventual glass should be between 50–80%. Amounts greater than 80% require too high a temperature for densification which could result in a fusion of the modifier cations to the surface of the silica particles comprising the gel structure and destroy the compositional profile formed by the interchanging ions. Less than 50% SiO$_2$ is not sufficient to form a strong gel.

A mixture of TMOS and TEOS is preferable because with TEOS alone the gel does not increase in viscosity quickly enough to attain sufficient rigidity which allows the ions to interchange and because the gel will not dry without deformation.

TEOS and/or TMOS are intensively mixed with an aqueous solution of boric acid or boron trimethoxide as a source of boron to yield B$_2$O$_3$ in the eventual glass. Other sources of B$_2$O$_3$ useful herein include boron triethoxide.

The molar percentage of B$_2$O$_3$ in the eventual glass should be between 5-20%. More than 20% makes the gel weak; less than 5% will not provide a sufficient source of B$_2$O$_3$.

Boric acid is preferred to reduce the sintering temperature and to eliminate devitrification of the gel during densification.

Together, the sum of SiO$_2$ and B$_2$O$_3$ in the eventual glass should be less than 85% on a molar basis in order to obtain eventual glass with $\Delta_n \geq 0.02$.

To the aqueous solution of TMOS/TEOS/boric acid is added an acid catalyst, such as HCl or HNO$_3$. The acid will catalyze the hydrolysis and polycondensation of the solution to yield a heated sol of fine silica particles about 20A in diameter. The sol may be cooled at room temperature.

Once the sol is cooled, an aqueous solution of a first metal salt is added to yield a mixture. The salt may be of any kind provided that it decomposes at a temperature below the point where densification takes place, and further provided that the eventual first metal oxide formed in the glass acts as a modifier to increase the index of refraction in the eventual glass. Examples of such salts include acetates and nitrates of Pb, Tl, Cs, La, Rb, Ta, Nb, Ba and Sr. Note that these elements are mono-, di-, tri- and quinta-valent. Depending upon the valence of the ions selected, the ions used for the subsequent aqueous salt bath can have a valence different from these.

The concentration of the salt should be approximately 0.1 to 1.0 moles/L. Much greater than 1.0 moles/L causes the precipitation of hydrolyzed silica particles; much less than 0.1 moles/L requires too much time to form a gel and leads to too much shrinkage in the gel upon drying. The amount of salt should yield 10-40% of a first metal oxide in the eventual glass.

The mixture then is poured into a mold. The mold typically is cylindrical but may be of any other desired shape. The mold may be made of plastic or polymer coated glass. Teflon (TM-generically, polyfluoroethylene) or polystyrene are preferred. The sol is allowed to set for a minimum of tens of minutes up to several hours depending upon the temperature and the concentration of the salt added. Upon setting, a gel will form.

An alternative to the gel formation described above is to use an alcoholic alkoxysilane/alkoxyborine solution. Again, TEOS and/or TMOS are preferred sources of alkoxysilane, and boron methoxide or boron ethoxide are the preferred sources of alkoxyborine. The alcohol may be selected from methanol or ethanol.

To make the gel, TMOS and/or TEOS in an alcohol are intensively mixed with an alkoxyborine. An aqueous solution of a first metal salt as described above is then added as above. This will form a mixture which then may be poured into a mold to gel as above. Upon setting, a gel will form.

In both cases, the gel then may be removed from the mold. Where the gel is derived from the solution containing alcohol, it first must be dried until the diameter of the gel decreases to approximately ⅔ of its original size. Failure to dry the gel at this point will cause it to crack upon final drying and densification.

Once removed and dried if necessary, the gel is placed in an aqueous salt bath (or "second" salt). This allows the ions in the salt bath to diffuse into the gel and interchange with the metal ions already present. These ions also will act as modifier cations forming a second metal oxide in the eventual glass. The salt may be of any kind provided it decomposes before the collapse of the micropores in the gel upon heating and further provided that it acts to decrease the index of refraction in the eventual glass. Examples of such salts include acetates and nitrates of Li, Na, K or Zn. As with the selection of metal salts above, these ions are mono- and divalent. The valence of the salt selected can be different from the valence of the first selected salt.

The concentration of this salt should oe approximately 0.1 to 0.5 moles/L. Too concentrated a solution will cause too much precipitation of crystals within the micropores of the gel while drying resulting in fracture. Too dilute a solution will not provide sufficient metal oxides in the eventual glass necessary for uniform sintering. The amount of salt solution should be sufficient to yield a 10-40% molar fraction of a second metal oxide in the eventual glass.

Upon immersion, the first metal salt ions will diffuse into the salt bath while the metal ions in the salt bath will diffuse into the gel. A gradient will be established with a higher concentration of first metal ions in the center of the gel, with the concentration thereof decreasing radially toward the perimeter, and a higher concentration of second metal ions from the salt bath at the perimeter, with the concentration thereof decreasing radially towards the center. The length of time necessary to establish a desired gradient is a function of the configuration of the gel, the concentration of the aqueous solution of the salts and time.

Upon removal from the salt bath, the gel may oe dried at any temperature between approximately room temperature and 80° C. The dried gel then is dessicated to a xerogel at a temperature of approximately 100° C. The xerogel then is densified to a monolithic pore free glass by heat treatment up to a temperature around the glass transition point of melt-formed glass of similar composition. Densification will collapse the micropore structure of the xerogel making it uniform.

The following are illustrative examples of specific embodiments of the process.

EXAMPLE 1

20 ml of TMOS, 20 ml of TEOS, 40 ml of an aqueous solution of boric acid (0.8 moles/L) and 5 ml/L of HCl were mixed under intensive stirring until the mixture turned to a clear solution. The clear solution was a sol containing a suspension of silica which warmed by its own heat of reaction and was allowed to cool to room temperature. 5 ml of aqueous solution of lead nitrate (0.5 moles/L) were slowly added to 15 ml of the sol under stirring, followed by the addition of 30 ml of the aqueous solution of lead acetate (0.25 moles/L).

The lead-containing sol was poured into a cylindrical mold of polystyrene, 20 mm in diameter and 80 mm long. Half tne height of the container was filled, and the sol was allowed to set at room temperature with a tigntly sealed cover. The resulting gel aged overnight, and then was taken out of the mold. It was immersed in tne aqueous solution of potassium nitrate (0.25 moles/L) for 1 hour. The gel then was placed on a polystyrene plate to gradually shrink under ambient atmosphere for 6 hours, followed by drying in an oven overnight at 60° C.

The xerogel then was densified to a clear cylindrical glass by heating with an electric oven in a fused quartz reaction tube by the ordinary way of densification of alkoxy-derived silicate gels. That is, the xerogel was heated according to a stepwise heat cycle having plateaus at 200°, 350°, 460° and 600° C., under the oxygen gas flow at a rate of about 50 ml/min up to a temperature slightly above 460° C., where the gas was switched to He. A structure of 6 mm diameter and $\Delta_n = 0.02$ was produced.

EXAMPLE 2

20 ml of TEOS and 20 ml of the aqueous solution of boric acid (0.8 moles/L) containing 5 ml/L HCl were mixed under intensive stirring until the mixture turned to a clear solution. The clear solution was a sol and warmed by its own heat of reaction. It was allowed to cool to room temperature. 10 ml of an aqueous solution of lead nitrate (0.5 moles/L) were added to 15 ml of the sol under stirring, followed by the addition of 40 ml of the aqueous solution of lead acetate (0.25 moles/L).

The lead-containing sol was poured into a cylindrical mold of polystyrene and allowed to gel with a tightly sealed cover. After the gel was taken out of the cylinder, it was treated the same as in Example 1 to form a glass of gradient index.

EXAMPLE 3

20 ml of TMOS and 5 ml of boron methoxide, $B(OCH_3)_3$, dissolved in 30 ml of methanol, was added to 40 ml of an aqueous solution of lead nitrate (0.5 moles/L) under intensive stirring. The lead-containing clear solution was contained in a cylindrical mold of polystyrene and allowed to set at room temperature with a tightly sealed cover. The resulting gel was dried until the gel was reduced to ⅔ of its original size and then taken out of the mold. It then was immersed in the aqueous solution of potassium nitrate (0.5 moles/L). The gel then was treated similarly to Examples 1 and 2.

EXAMPLE 4

20 ml of TEOS and 5 ml of boron triethoxide, $B(OC_2H_5)_3$, dissolved in 30 ml of ethanol, was added to 10 ml of an aqueous solution of cesium nitrate (0.5 moles/L) under intensive stirring. The cesium-containing clear solution was contained in a cylindrical mold of polystyrene and allowed to set at room temperature with a tightly sealed cover. The resulting gel was dried as in Example 3 and then was taken out of the mold. It then was immersed in an aqueous solution of sodium nitrate (0.5 moles/L). The gel then was treated similarly to Examples 1 to 3.

EXAMPLE 5

20 ml of TMOS, 20 ml of TEOS, 40 ml of an aqueous solution of boric acid (0.8 moles/L) and 5 ml/L of HCl were mixed under intensive stirring until the mixture turned to a clear solution. The clear solution was a sol containing a suspension of silica which warmed by its own heat of reaction and was allowed to cool to room temperature. 10 ml of aqueous solution of cesium nitrate (0.5 moles/L) was slowly added to 15 ml of the sol under stirring, followed by the addition of 30 ml of the aqueous solution of lead acetate (0.25 moles/L).

The cesium and lead-containing sol was poured into a cylindrical mold of polystyrene, 20 mm in diameter and 80 mm long. Half the height of the container was filled, and the sol was allowed to set at room temperature with a tightly sealed cover. The resulting gel aged overnight, and then was taken out of the mold. It was immersed in the aqueous solution of potassium nitrate (0.25 moles/L) for 1 hour. The gel tnen was treated tne same as in Example 1.

EXAMPLE 6

20 ml of TMOS, 20 ml of TEOS, 40 ml of an aqueous solution of boric acid (0.8 moles/L) and 5 ml/L of HCl were mixed under intensive stirring until the mixture turned to a clear solution. The clear solution was a sol containing a colloidal suspension of silica which warmed by its own heat of reaction and was allowed to cool to room temperature. 10 ml of aqueous solution of rubidium nitrate (0.5 moles/L) was slowly added to 15 ml of the sol under stirring, followed by the addition of 30 ml of the aqueous solution of lead acetate (0.25 moles/L).

The rubidium and lead-containing sol was poured into a cylindrical mold of polystyrene, 20 mm in diameter and 80 mm long. Half the height of the container was filled, and the sol was allowed to set at room temperature with a tightly sealed cover. The resulting gel aged overnight, and then was taken out of the mold. It was immersed in tne aqueous solution of potassium nitrate (0.25 moles/L) for 1 hour. The gel then was treated the same as in Example 1.

EXAMPLE 7

20 ml of TMOS, 20 ml of TEOS, 4 ml of boron trimethoxide and 40 ml of an aqueous solution of nitric acid (0.5 moles/L) were mixed under intensive stirring until the mixture turned to a clear solution. The clear solution was a sol containing a colloidal suspension of silica which warmed by its own heat of reaction and was allowed to cool to room temperature. 40 ml of aqueous solution of cesium acetate (0.5 moles/L) was slowly added to 25 ml of the sol under stirring.

The cesium-containing sol was poured into a cylindrical mold of polystyrene, 20 mm in diameter and 80 mm long. Half the height of the container was filled, and the sol was allowed to set at room temperature with a tightly sealed cover. The resulting gel aged overnight, and then was taken out of the mold. It was immersed in the aqueous solution of potassium nitrate (0.25 moles/L) for ½ hour. The gel then was treated the same as in Example 1.

Variations and modifications in the above-described process will suggest themselves to those skilled in the art. Accordingly, the foregoing description is illustrative and should not be taken in a limiting sense.

I claim:

1. A method of manufacturing gradient index glass comprising the steps of:
    (1) preparing either (a) a first solution of alkoxysilane with an aqueous source of boron to which an acid catalyst has been added, allowing said solution to cool, adding an aqueous solution of a first metal salt as a source of index modifier cations to form a mixture wherein said first metal salt will yield a high refractive index in said glass and pouring said mixture into a mold, or (b) a second alcoholic solution of alkoxysilane/alkoxyborine, allowing said solution to cool, adding an aqueous solution of a first metal salt as a source of index modifier cations to form a mixture wherein said first metal salt will yield a high refractive index in said glass and pouring said mixture into a mold;

(2) allowing sufficient time for said mixture to form a gel;

(3) removing said gel from said mold;

(4) drying said gel until it is reduced to approximately ⅔ of its size if the alcoholic solution is used;

(5) immersing said gel in an aqueous salt bath comprising a second metal salt as a source of index modifier cations wherein said second metal salt will yield a low refractive index in said glass and wherein the metal of said second metal salt comprise elements different from said first metal and wherein said second metal cations have a valence unequal to the index modifier cations of said first metal salt;

(6) removing said gel from said bath;

(7) drying said gel;

(8) dessicating said gel; and (9) densifying said gel at a temperature around the glass transition point temperature.

2. The method according to claim 1 wherein said solution of alkoxysilane comprises a solution of tetramethoxysilane, tetraethoxysilane or a combination thereof.

3. The method according to claim 1 wherein the concentration of said alkoxysilanes yields 50–80% silicon oxide on a molar basis in said glass.

4. The method according to claim 1 wherein said source of boron comprises boric acid, boron triethoxide or boron trimethoxide.

5. The method according to claim 1 wherein the concentration of said boron yields 5–20% $B_2O_3$ on a molar basis in said glass.

6. The method according to claim 1 wherein the concentration of alkoxysilane and boron yielding silicon oxide and $B_2O_3$ is less then 85% on a molar basis of said glass.

7. The method according to claim 1 wherein said first metal salt is selected from the group consisting of acetates and nitrates of Pb, Tl, Cs, Ba, La, Nb, Rb and Ta.

8. The method according to claim 1 wherein the concentration of the metal salt is approximately 0.1 to 1.0 moles/L.

9. The method according to claim 1 wherein said second metal salt is selected from the group consisting of acetates and nitrates of Li, K, Na and Zn.

10. The method according to claim 1 wherein said salt bath concentration is approximately 0.1 to 0.5 moles/L.

11. The method according to claim 1 wherein said acid catalyst is selected from the group consisting of HCl and $HNO_3$.

12. The method according to claim 1 wherein said second solution of alkoxysilane comprises a solution of tetramethoxysilane, tetraethoxysilane or a combination thereof.

13. The method according to claim 1 wherein said second solution of alkoxyborine comprises a solution of ooron trimethoxide or boron triethoxide.

14. The method according to claim 1 where said alcoholic solution comprises a solution of methanol or ethanol.

* * * * *